2,620,567

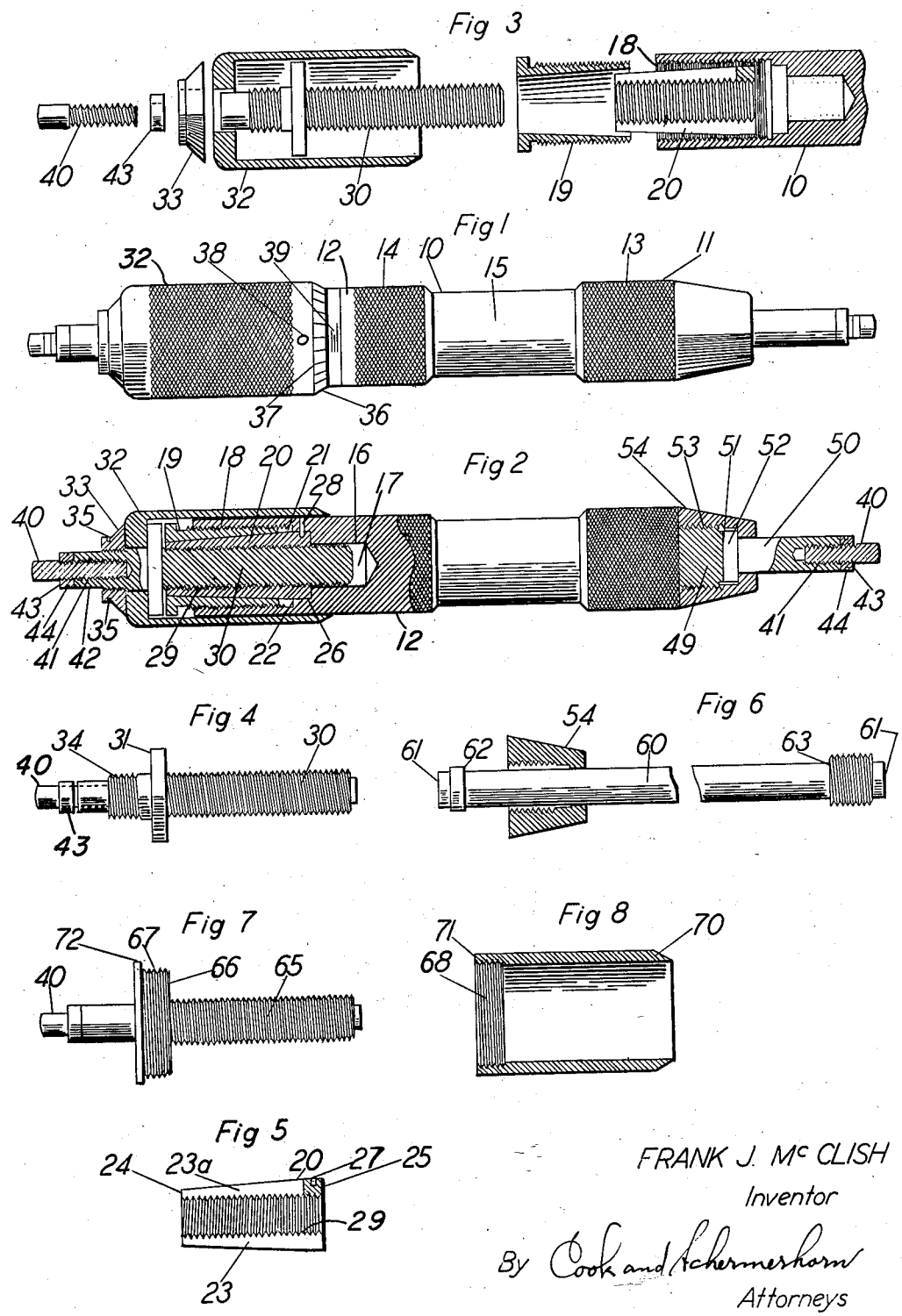
Dec. 9, 1952  F. J. McCLISH  2,620,567
MICROMETER
Filed Nov. 18, 1946
FRANK J. McCLISH
Inventor
By Cook and Schermerhorn
Attorneys Patented Dec. 9, 1952

UNITED STATES PATENT OFFICE 2,620,567

MICROMETER

Frank J. McClish, Portland, Oreg.

Application November 18, 1946, Serial No. 710,451

8 Claims. (Cl. 33—164)

This invention relates in general to micrometers and has particular reference to an improved inside micrometer having provision for the use of extension rods in different combinations for making accurate measurements to any desired length.

Objects of the invention are to provide an improved mechanical construction to reduce the amount of wear which ordinarily occurs in the moving parts of the micrometer and on the ends of the various rods which may be attached to the body of the micrometer in taking measurements, to provide means for compensating for wear which cannot be avoided in the normal use of the instrument, and to provide improved means to adjust the fit between the rotatable spindle and the body of the micrometer to maintain a smooth working action between those parts.

The invention resides in the combination of parts and in the details of construction shown by way of illustration in certain preferred embodiments of the invention on the accompanying drawings.

In the drawings:

Figure 1 is a side elevation view of a micrometer embodying the principles of the invention;

Figure 2 is a view similar to Figure 1 with certain parts shown in longitudinal section to illustrate the internal construction;

Figure 3 is a fragmentary exploded view of certain of the parts shown in Figure 2;

Figure 4 is a view of the micrometer spindle;

Figure 5 is a longitudinal sectional view of the spindle sleeve;

Figure 6 is a view of an extension rod for use with the micrometer shown in Figures 1 and 2;

Figure 7 illustrates a modified form of spindle; and

Figure 8 illustrates a thimble for use with the spindle shown in Figure 7.

As shown in Figures 1 and 2 the working parts of the present micrometer are enclosed in and associated with a body 10 having a rod end 11 and a spindle end 12. These end portions are knurled at 13 and 14, respectively, to provide a convenient gripping surface for holding the micrometer, and the central portion 15 of the body is turned down to a smaller diameter to provide a convenient shape and to lighten the body weight.

The spindle end is bored at 16 to a depth sufficient to leave clearance space 17 beyond the end of the spindle, and counterbored and internally threaded at 18 to receive an externally threaded spindle sleeve nut 19. The nut 19 has a smooth, tapered, internal bore which fits snugly over a similar conical taper on a split spindle sleeve 20, the length of the nut being such as to allow a clearance space 21 for adjustment between the end of the nut and the bottom 22 of the counterbore 18. The external threaded surface of nut 19 is cylindrical, there being no tapered threads in any part of the instrument.

As shown in Figure 5, the tapered sleeve 20 is provided with two diametrically opposite slits 23 and 23a extending from its small end 24 to its base portion 25 which is of external cylindrical shape to fit snugly in a counterbored seat 26 in the body 10. A hole 27 is provided in the base 25 to receive the screw dowel 28 through the body to prevent the spindle sleeve from rotating in its seat. The sleeve has an interior straight bore containing threads 29 to fit the threads on the spindle 30. In the present construction the slit 23 extends the full length of the sleeve, whereas the slit 23a extends axially only to the cylindrical base portion 25 and thence circumferentially for about 90° in the root of one of the threads 29, but different slitting arrangements may be employed to produce parallel collapsing of the sleeve by the nut 19 as the latter is screwed into the threaded bore 18 in the micrometer body. As the nut 19 is advanced onto the spindle sleeve the true fitting, tapered surfaces between the nut and sleeve produce a parallel collapsing of the spindle sleeve so as to distribute an even pressure along the full length of the threaded engagement between the sleeve and the spindle, permitting an easy and smooth adjustment of the rotative friction between the parts. In this way all lost motion is eliminated without binding or roughness in the movement. By distributing the clamping pressure over the entire length of the sleeve the maximum local pressure at any point, and hence the wear on the parts, is reduced to a minimum. In prior art micrometers it has been customary to contract only a short length of the sleeve upon a relatively few threads of the spindle, thereby creating high wearing pressures. The pressure of nut 19 against the spindle sleeve also tends to keep the latter firmly and positively seated in the bottom of the counterbore seat 26.

The spindle 30 has an integral flange 31, against the outer face of which the knurled thimble 32 is firmly held by a press fit on the spindle and by spindle nut 33 which is screwed on a threaded portion 34 of the spindle. This nut is provided with holes 35 to fit a pin spanner wrench. The open end of the thimble has a beveled edge 36 upon which is inscribed a scale 37 preferably divided into 25 equal divisions, and having a zero mark as indicated at 38. The numeral 39 designates an inch scale inscribed on the spindle end of the body 10 as shown and having graduation marks spaced preferably .025 inch apart, every fourth graduation mark being designated in tenths of inches. The lead of the threads 29 is then made .025 inch, whereby the end of the thimble moves longitudinally from one graduation to the next on the scale 39 in each full revolution, fractions of a revolution producing an axial movement less than .025 inch which may be read on the scale 37 in the usual manner.

A threaded adjusting stud 40 is mounted in a precision drilled and tapped hole 41 in the outer end 42 of the spindle. This stud is maintained in fine adjustment by a lock nut 43 having drilled holes 44 for a pin wrench.

The rod end of the body 10 is provided with a fulcrum or end projection 49 adapted to receive either a rod standard 50 of suitable length or any one of a number of different extension rods to extend the range of the micrometer. The fulcrum portion 49 has a hardened face 51 forming a rod contact seat which is ground and vacuum lapped with the end face of the flange 52 on the rod 50. External threads 53 on the fulcrum portion 49 are adapted to secure a rod nut 54 as shown in Figure 2 with the lapped surfaces of the fulcrum and rod flange in firm mutual engagement. The rod nut 54 is adapted to turn loosely on the rod 50 and to engage and apply pressure behind the flange 52 so that as the nut is tightened on the fulcrum 49 the rod 50 is not required to rotate, whereby it will be brought firmly up against the seat 51 without wear. Likewise when the nut 54 is loosened it turns freely on the flange 52 so that the latter does not rotate on the seat 51 to produce wear.

To reduce friction between the nut and the rod the inner flange surface of the nut is preferably lapped to the back side of flange 52. The relatively large area of the vacuum lapped joint between face 51 and the end face of the flange 52 thereby prevents rocking of one face on the other and tends to hold the faces together, once they have been brought into surface to surface contact, with sufficient adhesion to resist any rotative drag of the nut on the rod.

The outer end of the rod standard 50 is provided with a precision drilled and tapped hole 41 to receive an adjusting stud 40 having a lock nut 43 arranged and mounted in the same manner as the similarly identified parts on the outer extremity 42 of the spindle. Even though wear is substantially eliminated in the flange 52 and seat 51 some adjustment must be provided for inevitable wear on the gauging surfaces which are rubbed against the work piece in gauging internal diameters and the like. Such wear is confined to the ends of the adjusting studs and may be easily compensated by adjustment of the studs in the spindle and rod standard without affecting the micrometer movement.

To facilitate checking and adjusting for wear on the ends of the adjusting studs, the over-all length of the spindle 30 and its stud 40 are fixed at a definite dimension whereby the amount of wear on the spindle stud may be measured directly. After the spindle stud has been adjusted, the stud in the rod standard may be adjusted to the proper over-all length of the micrometer. In this way all guesswork as to the origin of any existing error is eliminated and the error may be quickly and easily compensated.

Figure 6 illustrates an extension rod which may be interposed between the body 10 and rod standard 50 to extend the gauging distance. The extension rod 60 has a hardened, ground and vacuum lapped contact seat 61 at each end thereof, one end of the rod being provided with a retainer ring 62 shrunk in a groove near the end of the rod and the other end of the rod being provided with a retainer sleeve 63 shrunk into a groove in the rod. Either the ring 62 or the sleeve 63 may be formed integrally on the rod, but preferably at least one of these elements is formed as a separate piece to allow the nut 54 to be put on the rod therebetween. The nut 54 is adapted to fit the threads 53 on the body or the threaded sleeve 63 on another extension rod, whereby a plurality of such extension rods may be added to form the desired base length between the seat 51 on the micrometer body and the rod standard 50 which is then attached to the last extension rod. Precision is not required in the positioning of the retainer ring 62 or retainer sleeve 63 inasmuch as each of the nuts 54 has a sufficient threaded length to hold the rod seat 61 into firm engagement with the next rod or the fulcrum seat 51 as the case may be.

It is intended that the micrometer be supplied with a plurality of rod standards 50 of different lengths and likewise a plurality of rod extensions 60 of different lengths, whereby they may be combined in different ways to give the desired over-all length. It is preferred, for instance, for ordinary work, to provide two rod standards 50, one being of one inch length and the other being of two inch length. At least two rod extensions would also be provided, one being of two inch length and the other of three inch length, whereby the rod extensions may be used individually or in combination, and whereby either of the rod standards may be used directly on the micrometer body, on either of the rod extensions alone, or on the combination of both rod extensions. All of the joints between these parts are secured without twisting of the lapped end faces one upon the other, to substantially eliminate wear on these faces as described in detail with reference to the joint between the rod 50 and the micrometer body.

In conventional micrometers it has been the usual practice to attach extension rods by a twisting motion which in time produces objectionable wear not only on both ends of the various extension rods but also on the seat on the micrometer body. Wear occurs in these various places in different degrees depending more or less upon which rods are used the most. Such wear, therefore, cannot be compensated by a simple adjusting stud unless an adjustment is made each time the combination of extension rods is changed, which is an entirely unsatisfactory solution to the problem. In the present construction it will be seen that wear is substantially eliminated not only between the rod standard and the micrometer body but also in the connections between different extension rods and between the extension rods and the rod standard. Thus it is apparent that if the wear can occur only at the external end points, it can be easily compensated at those points without introducing an error regardless of what combination of extension rods and rod standards may be used.

Figures 7 and 8 illustrate an alternative form of the spindle and thimble elements. In this modification the spindle 65 is provided with an integral flange 66 having a threaded portion 67 adapted to receive the threaded end 68 of the thimble 70. The threaded end of the thimble is provided with a finished face 71 which is adapted to be tightened against a flange or shoulder 72 at the base of the threaded portion 67 on the spindle. This construction provides for self-retention of the parts without requiring a retaining nut, thereby reducing the cost of manufacture. It is intended that the other parts of the micrometer be the same as illustrated in Figures 1 to 3 whereby the spindle 65 and thimble 70 may be substituted for the spindle 30, thimble 32 and retaining nut 33 in the first embodiment.

Other changes in the construction and arrangement of parts will occur to persons skilled in the art, and all such modifications within the spirit of the appended claims are included in the invention.

Having now described my invention and in what manner the same may be used, what I claim as new and desire to protect by Letters Patent is:

1. In a micrometer, a body member provided with an internally threaded bore; an internally threaded sleeve within said body member, said sleeve having a smooth, conical exterior surface for substantially its full length and having a longitudinal split extending its full length, a spindle in threaded engagement within said sleeve; and a tapered adjusting nut having threaded engagement within said body for substantially the full length of said sleeve and adapted to bear on said sleeve substantially throughout the length thereof to collapse substantially the entire length of said sleeve in parallel compression upon said spindle.

2. In a micrometer, a body member provided with an internally threaded bore at one end; an internally threaded sleeve within said body member and spaced throughout the sleeve length from said threaded bore, said sleeve having a smooth conically tapered outer surface throughout its length and having a longitudinal split extending its full length, a spindle in threaded engagement within said sleeve; and a nut of a length approximately equal to the length of said sleeve and having a smooth, conical bore complemental to the conical tapered surface of said sleeve, said nut being mounted between said sleeve and said internal bore of said body member and in threaded engagement with said body member throughout substantially the same length of said sleeve whereby said nut is effective to collapse substantially the entire length of said sleeve in parallel compression upon said spindle to adjust the frictional engagement between said sleeve and said spindle.

3. A micrometer having a body, provided with a longitudinal center bore and an internally threaded counterbore, a counterbored seat intermediate said center bore and said counterbore, a split externally tapered sleeve secured in said counterbored seat and having a threaded bore forming an extension of said center bore, an externally threaded nut threadedly engaging in said counterbore for approximately the full length of said sleeve and having a smooth, tapered, internal bore snugly fitting over approximately the full length of said split sleeve to effect parallel compression of said sleeve, and a spindle threadedly engaging said sleeve.

4. A micrometer as defined in claim 3 wherein the tapered sleeve is split throughout substantially the full length of the sleeve.

5. In a micrometer as defined in claim 3, a shoulder perpendicular to the axis of the spindle adapted for engagement with the outer end of the sleeve to limit axial movement of the spindle into the body member.

6. A micrometer as defined in claim 3 wherein locking means commonly engages the sleeve at its root end and said body member to prevent relative rotation therebetween.

7. In a micrometer extension rod assembly, a rod having flat contact seats on extreme opposite ends thereof, said contact seats being disposed in uninterrupted parallel planes and being vacuum-lapped, a circular abutment flange extending entirely around said rod near one end thereof, and a threaded portion on the other end of said rod, and a nut rotatable on said rod and adapted to engage said flange to a similar threaded portion on a second rod to secure the seat adjacent said flange on said first rod in firm engagement with a similar rod contact seat adjacent the threaded portion on said second rod without relative rotation between said rods in all rotative positions of said nut.

8. In a micrometer assembly, a joint construction for securing two members together in end to end relation, said members each having a flat contact seat on an extreme end of the member, each of said contact seats having a continuous uninterrupted contact surface over the whole area bounded by the outer periphery of the seat for vacuum lapping of the two seats, external screw threads on one of said members adjacent its said contact seat, an annular shoulder on and extending entirely around the other member adjacent its said contact seat, a nut engaging said threads on said one member and having a portion surrounding said other member, and an annular flange on said portion of said nut engaging said shoulder around the entire circumference of said shoulder and holding said members together in all rotative positions of the nut without relative rotation between said two members.

FRANK J. McCLISH.

REFERENCES CITED

The following references are of record in the file of this patent:

UNITED STATES PATENTS

| Number | Name | Date |
| --- | --- | --- |
| 347,844 | Usher | Aug. 24, 1886 |
| 373,705 | Wells | Nov. 22, 1887 |
| 1,018,172 | Downs | Feb. 20, 1912 |
| 1,041,858 | Normoyle | Oct. 22, 1912 |
| 1,216,680 | Fransosi | Feb. 20, 1917 |
| 1,517,761 | Sorensen et al. | Dec. 2, 1924 |
| 1,763,941 | Witchger | June 17, 1930 |
| 2,193,939 | Sanford | Mar. 19, 1940 |
| 2,199,236 | Bigwood | Apr. 30, 1940 |
| 2,217,859 | Campen | Oct. 15, 1940 |
| 2,287,097 | Graham | June 23, 1942 |

FOREIGN PATENTS

| Number | Country | Date |
| --- | --- | --- |
| 80,872 | Germany | Apr. 24, 1895 |
| 382,544 | France | Dec. 11, 1907 |